Aug. 1, 1939.                M. S. JOHNSON                 2,167,979
                          BRAKE HANGER RETAINER
                           Filed Jan. 26, 1938
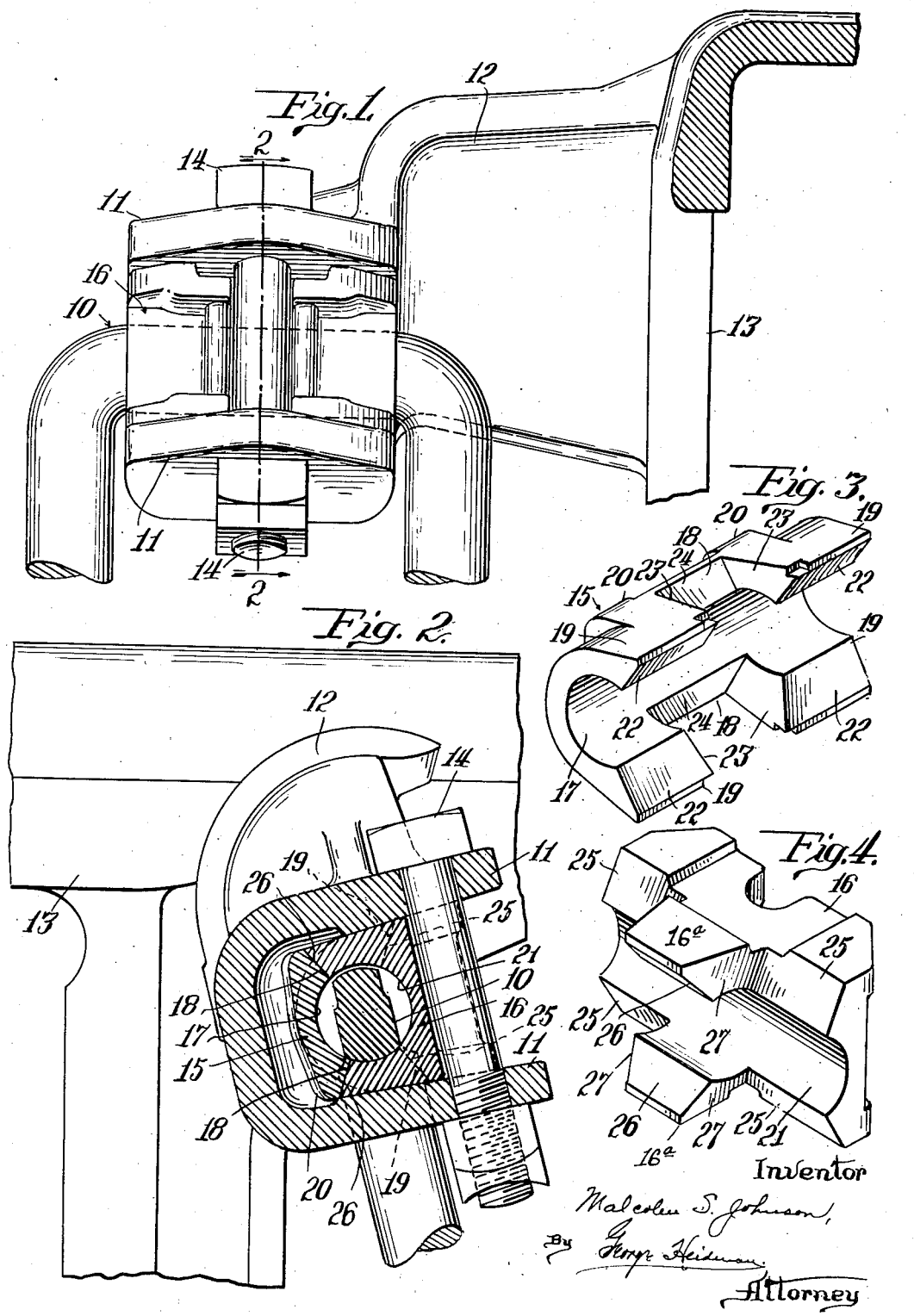
Inventor
Malcolm S. Johnson,
By George Heideman
Attorney Patented Aug. 1, 1939

2,167,979

UNITED STATES PATENT OFFICE 2,167,979

BRAKE HANGER RETAINER

Malcolm S. Johnson, Chicago, Ill., assignor to Illinois Railway Equipment Company, Chicago, Ill., a corporation of Illinois Application January 26, 1938, Serial No. 186,922

5 Claims. (Cl. 188—209)

My invention relates to means whereby the brake hangers of railroad cars are pendently supported in place in the sockets or pockets provided by the laterally extending brackets generally formed integral with the truck frames and involving a pair of vertically spaced portions or jaws which in turn are provided with openings at their outer ends to receive the fastening bolts or means.

My improved retainer means is more especially intended for use with the link type of brake hanger at present employed and has for its object the provision of a structure which may be easily assembled and the hangers or links held in proper position in a non-chattering relation with the bracket of the truck frame.

The invention also has for its object the provision of retainer means composed of a pair of complementary members having similar top and bottom surfaces which permit a reversal of the means to compensate for any differences in wear between the upper and lower sides or surfaces of the hanger socket or channel formed by the juxtaposed members which are provided with interengaging portions so arranged that the wear resulting from the more or less constant movement of the hangers or links will be distributed to both members of the retainer means.

The objects and advantages of my invention will be readily comprehended from the following detailed description of the accompanying drawing, wherein:

Figure 1 is a side elevation of the supporting arm or bracket of the truck frame with a portion of the truck frame in section and with my improved retainers in place; the lower portion of the link or hanger being broken away.

Figure 2 is a vertical sectional view taken along the line 2—2 of Figure 1.

Figure 3 is a perspective view of one member of the retainer.

Figure 4 is a similar view of the other member of the retainer.

My improved retainer is especially intended for use with the continuous or closed link type of hanger, a portion whereof is shown at 10; and, for purposes of exemplification, the invention is shown in connection with a pocket or socket closed at the rear end as shown in Figure 2 and formed between the vertically spaced portions or jaws 11, 11 disposed toward the wheels of the truck (not shown) at the outer end of the bracket or arm 12 shown preferably formed integral with the truck frame, a portion whereof is shown at 13.

In practice, the portions 11, 11 are generally made to slope upwardly as more clearly shown in Figure 2 to relieve the bolt or fastening means 14 of strains.

My improved retainer consists of the two complementary members 15 and 16 which are provided with matching sides and are arranged in side to side relation in the pocket or socket of the bracket 12; the members being of hard metal adapted to resist the wear resulting from the swinging movement of the brake hangers or links 10.

The member 15, which constitutes the inner member of the retainer, consists of an elongated block provided on one longitudinal side with an arcuate groove 17 extending from end to end and the upper and lower walls of this grooved portion each provided with a cut-out portion 18, preferably arranged in vertical alignment and thereby providing the pair of extensions 19, 19, on opposite sides of each cut-out portion 18, as shown in Figure 3.

The opposite or outer longitudinal side of member 15, intermediate of its ends, is shown provided with vertically disposed ribs or enlargements at 20, 20, to provide shoulders adapted to fit into the recess generally formed at the mid-portion of the rear wall of the pocket of the bracket as shown in Figure 2 and thus assist in holding the retainer against lengthwise movement, while the arcuate ends 19 of the member 15 seat in correspondingly dished or arcuate surfaces on the back wall of the bracket on opposite sides of the recess.

Member 16, which constitutes the outer member of the retainer, on its inner side, is provided with an arcuate groove 21 extending from end to end and intermediate of the ends of the member with the projecting portions or lugs 16ª, 16ª integral with the two longitudinal sides of the member, one above the other. These projections or lugs 16ª, 16ª match the cut-out portions 18, 18 in member 15 and are adapted to effect interengaging relation between the two members 15 and 16.

The contacting surfaces of the two members 15 and 16 are preferably beveled in opposite directions so as to provide lapping joints as it were; that is to say, the outer faces of the extensions 19, 19 of member 15 are beveled to slope outwardly as shown at 22, with the sides of the extensions 19 also sloping outwardly toward the top and bottom sides of the member 15, as shown at 23; while the top and bottom longitudinal walls of member 15 at the cut-out portions are beveled to slope inwardly toward the arcuate groove 17, as shown at 24.

The inner longitudinal edge or side of member 16 is beveled to slope inwardly toward the arcuate groove 21, as shown at 25, 25; while the outer surfaces or ends of the projections or lugs 21, 21 are beveled to slope inwardly as shown at 26; with the sides of these projections or lugs 21, 21 beveled to slope outwardly as shown at 27 in Figure 4.

As is apparent from this construction, the meeting or contacting surfaces of the two members match each other in a more or less lapping relation and tend to prevent vibration between the members. At the same time, with the projecting portions or lugs 19, 19 and 21, 21 of the two members extending beyond and to opposite sides of the vertical axis of the hanger receiving groove an irregular juncture between the two members is provided with the result that both members are more uniformly subjected to the action of the vibrating hanger 10, and less objectionable wear at the bottom of the groove results than is the case with retainer members having substantially straight meeting faces and the contact between the members made in a straight line along the center of the bottom of the groove. In practice, it has been found that the upper end of the link or hanger, which is of oblong cross-section (see Figure 2) seats itself on the straight-line juncture between juxtaposed retainer members and the more or less constant oscillations of the hanger induce comparatively rapid wear at the marginal edges of the members.

The beveled surfaces also tend to lock the two members against relative movement in a vertical direction, thus maintaining the proper relation between the two members.

I have described what I consider to be the best embodiment of my invention, but modifications are possible and may be made without, however, departing from the spirit of the invention as set forth in the appended claims.

What I claim is:

1. A brake hanger retainer comprising a pair of complemental members adapted to pendently hold a brake hanger therebetween and to fit into the hanger receiving socket provided on a truck frame, both members on their opposing longitudinal faces being each provided with an arcuate groove and with projecting portions, the projecting portions of one member being offset relative to those of the other member and effecting intermeshing relation with each other, said projecting portions being adapted to extend beyond the plane of the normal contacting surfaces of the members whereby a juncture line disposed to opposite sides of the plane of the longitudinal axis of the hanger receiving channel is provided.

2. A brake hanger retainer comprising a pair of complemental elongated members adapted to be arranged in side to side relation and grooved on their adjacent sides to pendently support a brake hanger therebetween, one of said members at its ends having longitudinally spaced projecting portions integral with the upper and the lower sides of the member, while the other member has projections integral with the upper and the lower sides and intermediate of the ends of the member, the projections of the two members being adapted to intermesh and to extend to opposite sides of the longitudinal axis of the hanger receiving channel whereby an offset or irregular juncture at the bottom of the hanger receiving channel is provided.

3. A brake hanger retainer comprising a pair of complemental elongated members adapted to be arranged in side to side relation, the adjacent sides of the two members intermediate of their tops and bottoms being each provided with an arcuate groove extending from end to end to combinedly provide a hanger receiving channel extending lengthwise of the members, the grooved sides of the members and on opposite sides of the groove being provided with projections, the projections of the two members being offset relative to each other so as to intermesh, the ends and sides of the projections and the longitudinal sides of the members being oppositely beveled to effect an overlapping juncture between the two members.

4. A brake hanger retainer comprising a pair of complemental elongated members adapted to be arranged in juxtaposition, the longitudinal side of one member having a pair of projections at each end, while the longitudinal side of the other member has a pair of projections intermediate of the ends of the member, the projections of the two members being adapted to intermesh and extend to opposite sides of the longitudinal median line of the retainer, the adjacent sides of each member and the inner faces of the projections being arcuately grooved to provide a hanger receiving channel between the members.

5. A brake hanger retainer comprising a pair of complemental members adapted to pendently hold a brake hanger therebetween and to fit into the hanger-receiving socket provided on a truck frame, both members on their opposing longitudinal faces being each provided with an arcuate groove and with laterally disposed projecting portions and with transversely cut-out portions, the projecting portions of one member being offset relative to those of the other member and matching the cut-out portions of the other member for effecting intermeshing relation with each other, said projecting portions being adapted to extend transversely beyond the plane of the normal contacting surfaces of the members whereby a juncture line disposed to opposite sides of the plane of the longitudinal axis of the hanger-receiving channel is provided.

MALCOLM S. JOHNSON.